Oct. 21, 1941.                  P. L. FRÉRET                    2,260,102
                            AUTOMOBILE VEHICLE
                        Filed Nov. 27, 1937           4 Sheets-Sheet 1
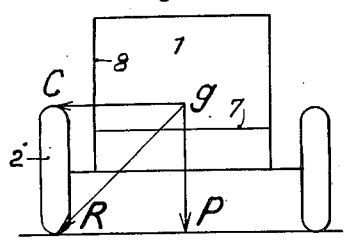
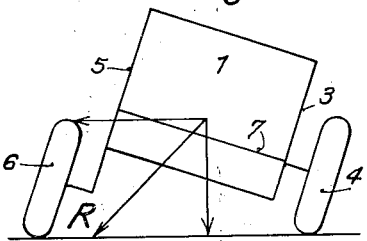
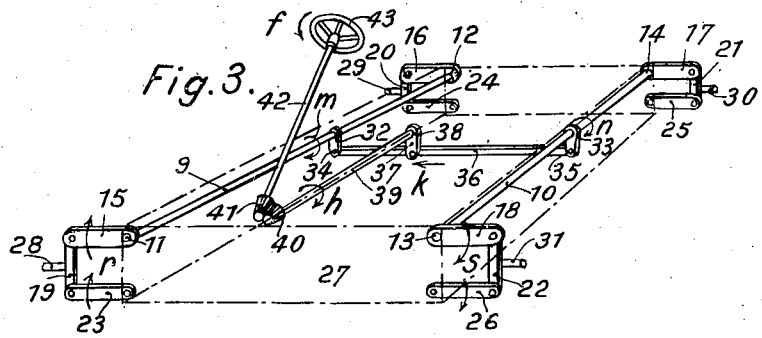
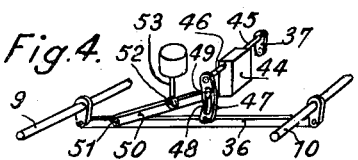
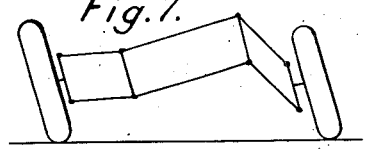
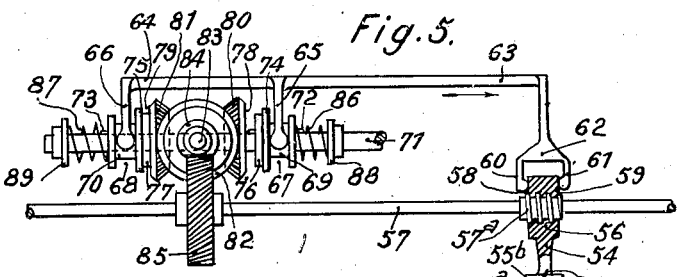
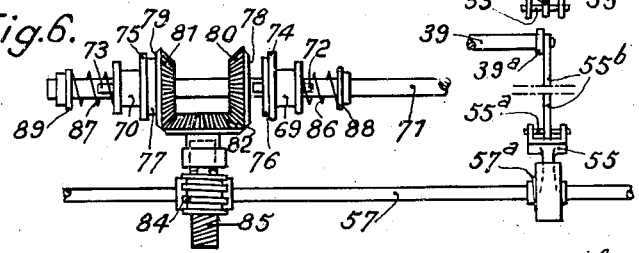
P. L. Freret
INVENTOR
By Glascock Downing Seebold
Attys.

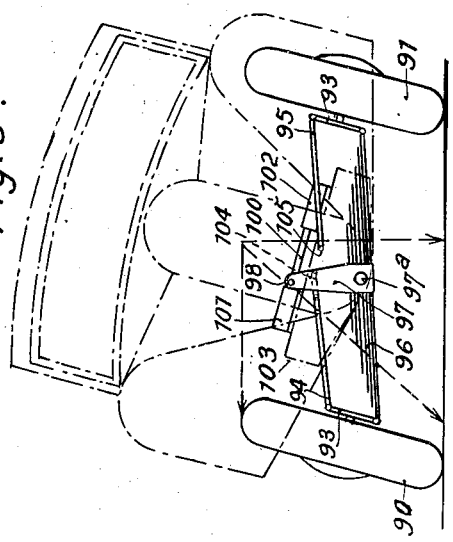
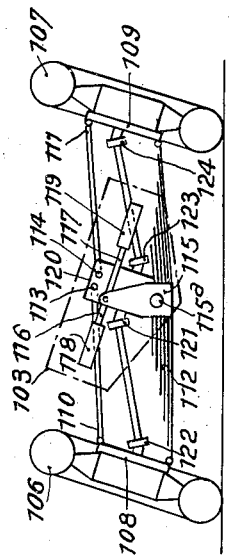
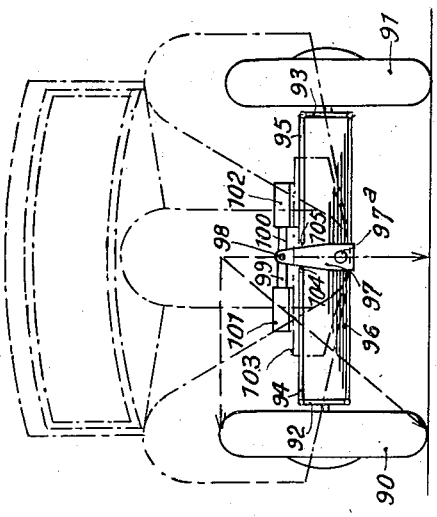
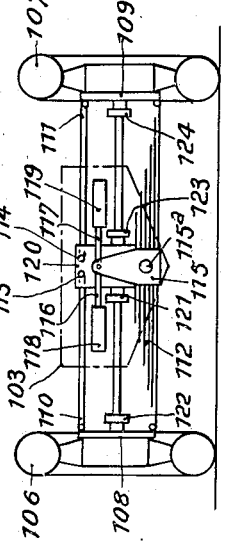

Oct. 21, 1941.  P. L. FRÉRET  2,260,102
AUTOMOBILE VEHICLE
Filed Nov. 27, 1937　　4 Sheets-Sheet 3
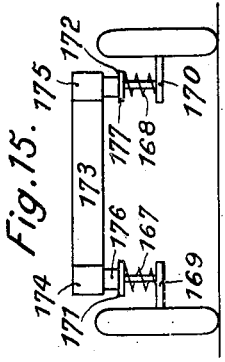
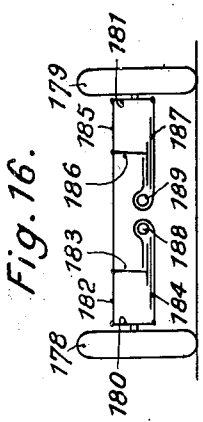
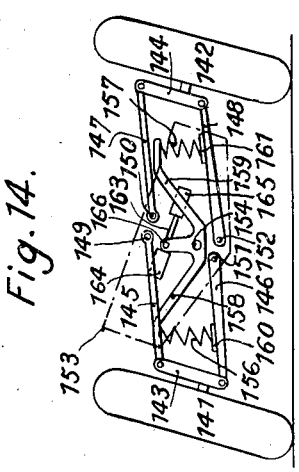
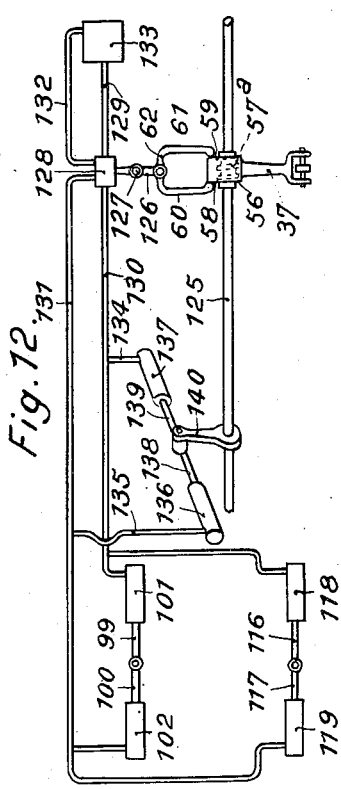
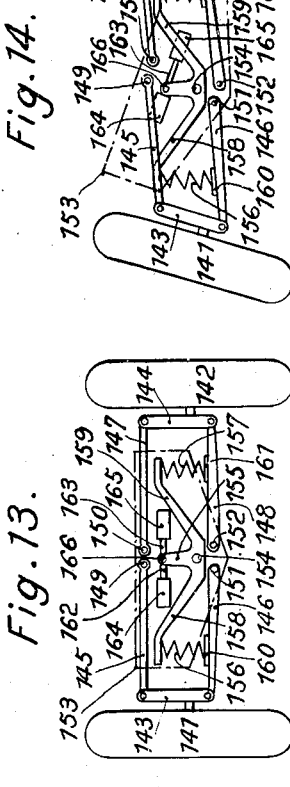
P. L. Freret
INVENTOR
By: Glascock Downing & Seebold
Attys.

Oct. 21, 1941.  P. L. FRÉRET  2,260,102
AUTOMOBILE VEHICLE
Filed Nov. 27, 1937  4 Sheets-Sheet 4
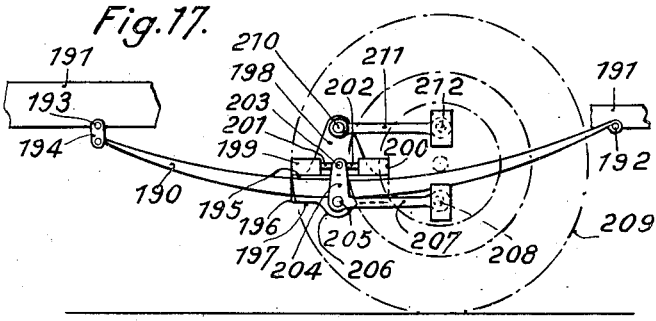
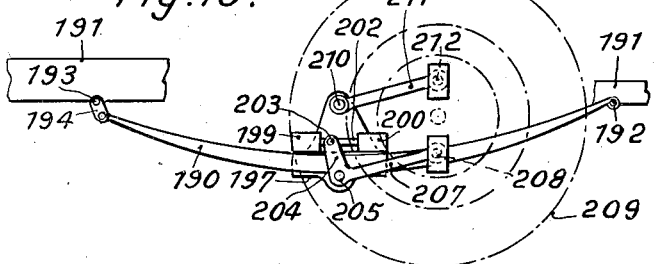
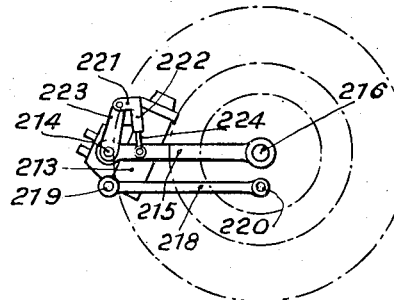
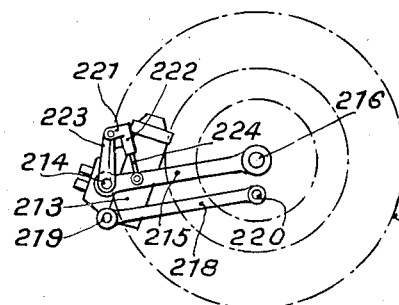
P. L. Fréret
INVENTOR
By Glascock Downing & Seebold
Attys.

Patented Oct. 21, 1941

2,260,102

UNITED STATES PATENT OFFICE 2,260,102

AUTOMOBILE VEHICLE

Paul Léon Fréret, Pitres, Eure, France

Application November 27, 1937, Serial No. 176,832
In France May 15, 1937

4 Claims. (Cl. 280—124)

The present invention relates to double track vehicles, that is to say vehicles having displacing members, such as wheels, which are mounted in pairs transversely to the direction of advance of the vehicle.

Such vehicles, in particular those which are automobiles and can move at high speed, hitherto offer, besides numerous advantages, the following drawback: when negotiating curves, the action of centrifugal force is not efficiently neutralized, and at high speeds there is a danger of this causing the vehicle to overturn, and in any case it forms a factor which is highly detrimental to the safety of the passengers.

Such a drawback is amplified by the indispensable presence of a system of suspension interposed between the wheels and the chassis of the vehicle: the deformation of said system resulting from the action of centrifugal force on the chassis, unfortunately facilitates this tendency to overturn. The designer is therefore faced with the following dilemma: either he must use a relatively flexible and therefore deformable suspension, in which case the danger of overturning or other similar accidents becomes extremely serious; or he must use a stiffer suspension which limits this danger but disagreeably decreases the comfort of the passengers.

The invention overcomes these drawbacks. It is characterized by the fact that, when negotiating curves, the vehicle can be inclined towards the inside of same.

The deformation of the vehicle, considered as a whole, is such that the action of centrifugal force is decreased with respect thereto, both to the advantage of the stability of the vehicle and to that of the sensation of comfort felt by the passengers.

The invention provides for the inclination taken up by the vehicle to be in relation to the position of the steering members, the steering wheel for example, thereby enabling, other things being equal, said inclination to be made proportional to the curvature of the curve which is being negotiated.

The invention also provides for said inclination to be in relation to the speed of the vehicle, so that it takes up a high value for high speeds and a low value which may become nil for low speeds.

According to the invention, the inclination taken up by the vehicle is obtained by means of a judicious deformation of the system of suspension, so that the latter, instead of forming as hitherto a danger factor when negotiating curves, contributes on the contrary to the stability of the vehicle on the road while taking curves.

It is therefore now possible to provide vehicles with a system of suspension which fulfills in the highest degree the conditions of comfort of the passengers for a displacement of the vehicle in a straight line, without its being necessary to take into account the limitations required in this respect by the conditions of safety for negotiating curves, such conditions being fulfilled by the application of the invention.

The inclination of the vehicle is produced in the simplest maner by the actual operation of the steering control member, for example the steering wheel.

In the case of relatively heavy vehicles, the invention provides for the intervention, after the said control member, of a servo-motor for producing said inclination.

The invention applies to vehicles utilizing any system of suspension: leaf springs, coil springs, hydraulic suspension, torsion bar suspension, etc.

Of course, the means employed for causing the deformation of these systems which corresponds to the desired inclination, will vary according to said systems.

A number of such means will be described hereinafter by way of examples, reference being had to the accompanying drawings in which:

Fig. 1 shows symbolically an ordinary vehicle negotiating a curve.

Fig. 2 shows, under the same conditions, a vehicle according to the invention.

Fig. 3 shows diagrammatically a construction of a system of suspension by means of torsion bars, modified according to the invention.

Fig. 4 is a partial diagrammatical view of a modification of this system, in the case of heavier vehicles.

Fig. 5 is a detail view of certain members of the modification according to Fig. 4.

Fig. 6 is a corresponding plan view.

Fig. 7 shows the deformation, when negotiating a curve, of a train of wheels of a vehicle provided with the system of suspension according to Fig. 3.

Fig. 8 shows diagrammatically a front wheel-train having a leaf spring suspension, provided with the improvement according to the invention and during the displacement of the vehicle in a straight line.

Fig. 9 shows the same wheel-train, but while the vehicle is negotiating a curve.

Fig. 10 shows the corresponding rear driving wheel-train, during a displacement in a straight line.

Fig. 11 shows same while negotiating a curve.

Fig. 12 shows a hydraulic arrangement for controlling the deformation of a system of suspension of a vehicle according to Figs. 8 to 11.

Fig. 13 shows a wheel-train having a coil spring suspension, provided with the improvement according to the invention.

Fig. 14 shows the same after deformation.

Fig. 15 is a modification of same.

Fig. 16 shows diagrammatically a suspension by means of half transverse leaf springs, provided with the improvement according to the invention.

Figs. 17 and 18 are diagrammatic views showing respectively before and after deformation a suspension by means of longitudinal leaf springs, provided with the improvement according to the invention.

Fig. 19 shows diagrammatically a suspension of the "Dubonnet" type, provided with the improvement according to the invention.

Fig. 20 shows the same after deformation.

In Fig. 1, an end view of an ordinary automobile vehicle negotiating a curve has been shown symbolically.

The sprung portion is represented by 1. When a curve is being negotiated, the forces exerted on the vehicle are, on the one hand gravity P, and on the other hand centrifugal force C. These two forces are applied at the centre of gravity g of the vehicle.

According to Fig. 1, the resultant R of said two forces passes through the point of contact of the wheels 2 placed on the outside of the curve. The vehicle is therefore at the limit of overturning; if the speed of displacement were very slightly higher or the curvature of the curve very slightly smaller, the vehicle would overturn.

Fig. 2 shows symbolically a vehicle according to the invention, placed under the same conditions.

In accordance with the invention, the sprung portion 1 of the vehicle has become inclined towards the inside of the curve. This inclination has been obtained by lowering the inner side 3 of said portion relatively to the corresponding wheel 4 and raising the other side 5 relatively to the other wheel 6. It will be seen that owing to this deformation, the resultant R encounters the ground distinctly inside the surface between the wheels 4 and 6: the vehicle is now well within the limit of overturning.

Furthermore, a passenger sitting on a seat 7 of the vehicle shown in Fig. 1, is urged against the wall 8 of the body by the action of centrifugal force.

This disagreeable effect is distinctly decreased in the vehicle according to the invention, owing to the inclination taken up by said seat.

In Fig. 3, a construction of a system of suspension by torsion bars has been shown diagrammatically, which enables the sprung portion of the vehicle to be inclined towards the inside of curves. This system of suspension comprises two longitudinal torsion bars 9 and 10 of a usual type. At the ends 11, 12, 14 and 13 of said bars are keyed one of the sides, respectively 15—16 and 17—18, of hinged parallelograms of which the other sides are formed by bars 19—20 and 21—22, and also 23—24 and 25—26, the fourth sides being formed by the actual chassis 27 of the vehicle.

The sides 19—20 and 21—22 carry the journals 28—29 and 30—31 of the vehicle wheels.

The vehicle chassis 27 is supported in the known manner at intermediate points of the torsion bars 9 and 10.

On these latter, substantially at their medial portions, are furthermore keyed levers 32—33 of which the ends 34—35 are pivotally connected to each other by a transverse bar 36. On said bar is attached a lever 37 which is keyed at its end 38 on a shaft 39 which furthermore carries a bevel-pinion 40. This latter meshes with a corresponding bevel-pinion 41 formed on the steering column 42 which carries the steering wheel 43.

The torsion bars 9 and 10 form the suspension system of the vehicle and operate in the known manner when the vehicle is travelling in a straight line.

When the vehicle approaches a curve, the driver turns the steering wheel 43 through a certain angle, so as to direct the vehicle wheels in accordance with the curve. The linkage system provided for this purpose between the steering column 42 and the wheels mounted on the journals 28 and 31 has not been shown in the drawing, in view of its absolutely usual nature.

If it is assumed, for example, that the rotation of the steering wheel 43 is effected in the direction of the arrow f, a rotation of the shaft 39 is thereby produced in the direction of the arrow h. This rotation causes a longitudinal displacement of the bar 36 in the direction of the arrow k, which causes a rotation of the torsion bars 9 and 10 about their respective axes in the direction of the arrows m and n.

To said rotations, there correspond rotations of the sides 15—23 and 16—24 in the direction of the arrows r and a rotation of the sides 18—26 and 17—25 in the direction of the arrows s.

As a result of this, the sprung portion on the left hand wheel side, Fig. 3, rises, whereas the sprung portion on the right hand wheel side falls, the vehicle taking up the position shown in Fig. 7 (seen from the front).

The inclination which the vehicle thus takes up towards the inside of the curve, is proportional to the angle through which the driver has turned the steering wheel 43.

The embodiment which has just been described is perfectly suitable for light vehicles.

For relatively heavy vehicles, it is necessary to interpose a servo-motor between the steering wheel and the suspension system which it is desired to deform while negotiating curves, in order to avoid any muscular effort on the part of the driver. Furthermore, for a given curve, it is advisable to make the inclination taken up by the vehicle proportional to the speed of displacement of the latter.

An arrangement which fulfils these conditions is shown diagrammatically in Fig. 4 by way of a modification.

In this modification, the lever 37 does not actuate the bar 36 directly as in Fig. 3, but through the instrumentality of a servo-motor 44, the input member of which is shown at 45 and the output member at 46. Said output member is rigidly secured to a curved lever 47 on which is provided a slide-way 48. Said slide-way engages the end 49, in the shape of a slider, of a connecting rod 50 of which the end 51 is pivoted at a fixed point on the transverse bar 36.

At an intermediate point 52 along the length of said connecting rod 50 is attached the rod 53 of a governor of a type known per se,—for example a ball governor—, the speed of rotation of which is proportional to the speed of the vehicle, for example by means of a mechanical connection with a member of the rear axle of said vehicle.

When the vehicle is moving at low speed, the rod 53 of the governor is in the position shown in Fig. 4; the slider 49 is towards the end of the slide-way 48 which is nearest the output member 46. Under these conditions, to a given rotation of said member, there corresponds a very small displacement of the bar 36, and therefore a very slight inclination of the vehicle.

When, on the contrary, the vehicle is moving at high speed, the rod of the governor 53 moves downwards; the slider 49 advances towards the end of the slide-way 48 which is farthest away from the output member 46.

Under these conditions, to the same given rotation of said member, there corresponds a relatively considerable longitudinal displacement of the transverse bar 36, and therefore a relatively considerable inclination of the sprung portion of the vehicle towards the inside of the curve.

It is obvious that the servo-motor could also be interposed between the steering wheel 43 and the lever 37.

In Fig. 5 a construction has been shown by way of example of a servo-motor which is shown symbolically at 44 in Fig. 4.

The input member of said servo-motor is formed by a lever 54 which performs the function of the lever 37 referred to above and to the end 55 of which is attached, through the intermediary of a pivot 55ᵃ, a connecting rod 55ᵇ of which the other end is pivoted on a lever 39ᵃ fixed on the shaft 39. The eye 56 of said lever 54 is tapped and is engaged with a screw 57ᵃ mounted on a shaft 57. The faces 58 and 59 of the lever 54 are embraced by the arms 60 and 61 of a fork 62 formed at the end of a bent rod 63 which performs the function of the above referred to input member 45. On the arm 64 of said rod 63 are formed two other forks 65 and 66 which are each introduced into the respective groove 67 and 68 of a respective sleeve 69 and 70. The sleeves 69 and 70 are keyed on an intermediate shaft 71,—which is driven by the engine of the vehicle or by a member of the rear axle of same—, with the possibility of longitudinal displacement relatively to said shaft, by means of long keys 72—73. On the cheeks 74 and 75 of said sleeves, are arranged clutch discs 76 and 77. These latter cooperate with corresponding discs 78 and 79 formed on the rear faces of bevel pinions 80 and 81 which are loosely mounted on the intermediate shaft 71.

Said pinions mesh with a corresponding common pinion 82 keyed on a shaft 83 which furthermore carries a worm 84 meshing with a worm wheel 85 keyed on the shaft 57.

The cheeks 69 and 70 of the sleeves are urged towards each other by springs 86 and 87 which bear on fixed stops 88 and 89.

The operation of this servo-motor is as follows:

When, by rotating the steering wheel 43, the lever 54 is rotated, it acts as a nut with respect to the screw 57ᵃ mounted on the shaft 57 and is displaced longitudinally by a corresponding amount relatively to said shaft. If, for example, this displacement takes place towards the right (Figure 5), it causes a corresponding displacement of the rod 63 which presses the clutch discs 77—79 against each other. The pinion 81 is then driven by the shaft 71 and,—through the intermediary of the pinion 82, the worm 84, and the worm wheel 85—, drives the shaft 57 which thus performs the function of the above referred to member 46. This rotation, which causes the lever 54 to move towards the left through the instrumentality of the nut 56 and the screw 57ᵃ, continues until said lever returns to its primitive position in which the contact between the clutch discs 77 and 79 is broken. This device therefore enables the shaft 57 to be rotated by the power of the engine of the vehicle an amount which is proportional to the angle through which the driver has turned the steering wheel 43.

In Figs. 8 to 11, wheel-trains have been shown having a suspension by means of transverse leaf springs, provided with the improvement according to the invention.

The front wheels 90—91 of the vehicle are carried by the sides 92 and 93 of hinged quadrilaterals of which the other sides are shown at 94 and 95, the lower sides of said quadrilateral being formed by the leaf spring 96. Fixed to the medial part of said spring is a bracket 97 on which are pivoted at a point 98, the rods 99 and 100 of hydraulic cylinders 101 and 102. Said jacks are carried by the sprung chassis 103 of the vehicle. The sides 94 and 95 are pivoted on said chassis at 104 and 105.

The wheels 106 and 107 are carried by sides 108 and 109 which are pivoted on the one hand on the transverse sides 110 and 111, and on the other hand on a leaf spring 112. The sides 110 and 111 are pivoted at their ends 113 and 114 on the sprung chassis 103.

On the leaf spring 112 is fixed a bracket 115 on which are attached the rods 116 and 117 of hydraulic cylinders 118 and 119 which are secured to the sprung chassis 103. The chassis is mounted so that it can rotate about the shaft 97ᵃ—115ᵃ.

The drive from the differential 120 is effected through the intermediary of a double Cardan joint, respectively 121—122 and 123—124.

The control of the inclination of the vehicle is effected by means of the hydraulic arrangement shown in Fig. 12. The lever 37 is connected to the steering wheel by a linkage system of any type, but which includes a governor of the type and performing the function described above (Fig. 4). Said lever is tapped internally at 56, in such a manner that it co-operates with a screw 57ᵃ mounted on a shaft 125. The cheeks 58—59 of the lever are embraced by the arms 60 and 61 of a fork 62 mounted at the end of a lever 126 which is pivoted about the pin 127. 128 is a distributor of a usual type, adapted to direct the liquid which penetrates therein through the pipe 129, either into a pipe 130, or into a pipe 131, or into a pipe 132 which returns to the pump 133 which drives the liquid into the pipe 129. The pump 133 is driven by the engine of the vehicle. The pipe 130 supplies the hydraulic cylinders 101 and 118, the pipe 131 supplies the hydraulic cylinders 102 and 119. Furthermore, pipes 134 and 135 branching off from the pipes 130 and 131, enable hydraulic cylinders 136 and 137 which are mounted in opposition to be supplied, the rods 138 and 139 of said cylinders being adapted to actuate a lever 140 keyed on the shaft 125.

When the lever 37 receives an oscillation produced by the rotation of the steering wheel by the driver of the vehicle, it causes a rotation of the lever 126 through the instrumentality of the screw and nut system 56—57ᵃ and the fork 62. Said rotation places the pipe 129, through the distributor 128, in communication either with the pipe 130, or with the pipe 131, according to the direction of the oscillation.

If, for example, the pipe 131 is supplied, the rods 100 and 117 of the cylinders 102 and 119 are pushed outwards, the rods 99 and 116 of the cylinders 101 and 118 moving a corresponding amount inwards. This results in a deformation of the suspension such as shown in Figs. 10 and 11. At the same time, the rod 138 of the cylinder 136 is pushed outwardly a corresponding amount, thereby rotating the lever 140 and also the shaft 125. When this latter rotation, by the effect of the screw and nut system 56—57ª, has brought the lever 37 back to its starting position, the supply of the hydraulic cylinders is shut off. It will therefore be seen that the deformation of the suspension and also the inclination of the vehicle, caused by the action of said cylinders, is proportional to the angle through which the driver turns his steering wheel.

In the inoperative position, the pump 133 operates through a by-pass, the liquid driven through the pipe 129 returning through the pipe 132.

It is obvious that this hydraulic arrangement could be utilized to control the deformation of the torsion bar suspension shown in Fig. 3.

In Figs. 13 and 14, a wheel train having a coil spring suspension and provided with the improvement according to the invention, has been shown diagrammatically.

The wheels 141 and 142 are carried by the sides 143 and 144 of hinged parallelograms, the other sides of which, 145 and 146 on the one hand, and 147 and 148 on the other hand, are hinged at 149—150—151 and 152 on the sprung chassis 153 of the vehicle.

Said chassis is mounted so that it can rotate about a shaft 154 which is interposed between two equalizing bars 155 at the front and at the rear. Coil springs 156 and 157 are interposed between the arms 158 and 159 of said equalizing bar and seats 160—161 fixed on the sides 146 and 148. The rods 162 and 163 of the hydraulic cylinders 164 and 165 which are mounted in opposition, are pivoted at a point 166 of the equalizing bar.

The operation of this improved suspension is similar to that described above for the previous suspension.

Fig. 14 clearly shows the deformation which the suspension undergoes when negotiating curves.

Fig. 15 is a modification of the suspension shown in Figs. 13 and 14.

The suspension is ensured by coil springs 167 and 168, interposed between base plates 169 and 170 which are secured to the wheels and flanges 171 and 172. The chassis 173 of the vehicle rests on said flanges through the intermediary of hydraulic cylinders 174 and 175, the pistons of which are shown at 176—177.

Fig. 16 shows diagrammatically the application of the invention to a suspension by means of transverse half springs. The wheels 178 and 179 are mounted on the sides 180 and 181 of hinged parallelograms, the other sides of which are formed respectively by the bars 182—183, the half spring 184 and by the bars 185—186 and the half spring 187.

Said half springs are mounted at the end of bars 188 and 189 of which the rotation, which is controlled in a similar manner to that described for the embodiment according to Fig. 3, causes the vehicle to be inclined inwardly when negotiating curves.

Figs. 17 and 18 show diagrammatically, in two positions seen from the side, a system of suspension by means of longitudinal leaf springs, provided with the improvement according to the invention.

The longitudinal leaf spring 190 is attached to the chassis 191 at the points 192 and 193, at the latter point through the intermediary of a shackle 194. Said spring is embraced, at its medial portion, by the arms 195 and 196 of a strap 197 which forms the lower end of a part 198. On the arm 195 are fixed two hydraulic cylinders 199 and 200 which are mounted in opposition and of which the rods 201 and 202 actuate the end 203 of a bell crank lever 204 on which they are pivoted. The lever 204 is mounted by means of a pivot 205 on a lug 206 formed on the arm 196. Its other end 207 is pivoted about a pin 208 rigidly secured to the journal of the wheel 209 corresponding to the spring 190. The part 198 is pivoted at 210 to the end of a connecting rod 211 of which the other end is pivoted about a pin 212 which is likewise rigidly secured to the journal of the wheel 209.

The pivots 205, 208, 212 and 210 form a parallelogram. In the case in which the wheel 209 is a steering wheel, the pivots 208 and 212 are arranged on the steering pin about which the wheel pivots for taking curves.

Fig. 17 shows the mean position of the suspension for straight line travel. The cylinders 199 and 200 are not under pressure. The spring 190 is in this case displaced in the usual manner when the wheel 209 passes over irregularities of the surface of the road.

When a curve is being negotiated, the rotation of the steering wheel by the driver ensures the supply of liquid under pressure to one of the cylinders, the jack 200 in Fig. 18. This supply is effected by a device similar to the one in Fig. 12. During the whole time the vehicle is travelling round the curve, the spring 190 undergoes a permanent deformation which is proportional to the angle through which the steering wheel has been turned and which causes it to take up the position shown in Fig. 18. It is about this position that the spring moves during the curve when the wheel 209 passes over irregularities of the surface of the road.

The spring on the same side of the other wheel train of the vehicle simultaneously undergoes the same deformation and the vehicle is inclined towards the inside of the curve as will now be understood from the previous explanations.

Figs. 19 and 20 show diagrammatically a well known suspension called "Dubonnet," which is mounted for example on Chevrolet cars of the type called "Master de Luxe 1937" and improved according to the invention. It is known that such a Dubonnet suspension has a spring device placed inside a cylinder 213 on which is fixed the chassis of the vehicle and which becomes operative when a spindle 214 which it includes is rotated. On said spindle was hitherto keyed the end of a connecting rod 215 of which the other end is mounted at 216 on the journal of the wheel 217. A second connecting rod 218 which is pivoted, on the one hand at 219 on the cylinder 213, and on the other hand at 220 on a member rigidly secured to a fixed part of the wheel, forms with the first connecting rod a hinged parallelogram.

As applied to this suspension, the improvement according to the invention consists in replacing the connection secured to the connecting rod 215 on the pin 214 by a connection giving the possibility of rotation and in interposing, between one of the two connecting rods 215 or 218 and the chassis, a double acting hydraulic cylinder 221. Said cylinder has a body 222 pivoted on an arm 223 of which the other end is keyed on the spindle 214; its rod 224 is pivoted on the connecting rod 215. This mounting prevents the cylinder 221 from being affected by the deformations of the suspension which are due to unevenness of the road.

It is obvious that when for example the rod 224 is made to come out of the two cylinders located on the same side of the vehicle, the chassis moves downwards on that side relatively to the corresponding wheels, thereby producing the inclination towards the inside of the curves.

I claim:

1. In an automobile vehicle having four wheels, four hinged parallelogram systems connecting the chassis to the wheels, a transverse front spring forming the lower side of the front parallelogram systems, a bracket fixed on said spring, two single-acting piston-cylinder systems secured to the vehicle chassis on either side of said bracket and of which the movable member is pivoted on the latter, a transverse rear spring forming the outer side of the rear parallelogram systems, a bracket fixed on said rear spring, two single-acting piston-cylinder systems secured to the vehicle chassis and arranged on either side of said rear spring bracket and pivoted on the latter, a pipe supplying fluid to the front and rear piston-cylinder systems located on the same side of the brackets, a pipe supplying fluid to the piston-cylinder systems located on the other side of said rear spring bracket, a piston-cylinder system supplied by a branch from the first pipe, a piston-cylinder system supplied by a branch from the second pipe, a common lever actuated by the movable members of these latter piston-cylinder systems, an intermediate shaft on which said lever is keyed, a screw thread on said shaft, a tapped lever in engagement with the threaded portion of said shaft, means for rotating this latter lever in proportion to the position of the steering control member of the vehicle, a pump for placing said fluid under pressure, a distributor interposed between the pump and the fluid pipes and adapted to selectively direct said fluid into either of the pipes, and an operating member for said distributor, actuated by the last mentioned lever.

2. In an automobile vehicle having four wheels, four hinged parallelogram systems connecting the chassis to the wheels, for each set of wheels on the same side of the vehicle a torsion bar secured at its ends to two homologous sides of the corresponding hinged parallelogram systems, a transverse rod, two levers secured to said bars and pivoted at the ends of said rod, a connecting rod pivoted on said transverse rod, a governor driven proportionally to the speed of the vehicle and of which the governing member is pivoted at an intermediate point of said connecting rod, a slider at the end of said connecting rod, a curved lever having a slide-way in which is engaged said slider, a servo-motor device on the output member of which said curved lever is fixed, an input member for said servo-motor, a lever fixed to said input member, a longitudinal rod secured to said lever, a pinion on said rod and meshing with a corresponding pinion formed on the steering column of the vehicle.

3. In an automobile vehicle having four wheels, four hinged parallelogram systems connecting the chassis to the wheels, for each set of wheels on the same side of the vehicle a torsion bar secured at its ends to two homologous sides of the corresponding hinged parallelogram systems, a transverse rod, two levers secured to said bars and pivoted at the ends of said rod, a connecting rod pivoted on said transverse rod, a governor driven proportionally to the speed of the vehicle and of which the governing member is pivoted at an intermediate point of said connecting rod, a slider at the end of said connecting rod, a curved lever having a slide-way in which is engaged said slider, a shaft on which said curved lever is fixed, a screw thread on said shaft, an intermediate lever surrounding said shaft and having a tapping engaged with said screw thread, two cheeks on said lever, a bent rod one fork-shaped end of which embraces said two cheeks, an intermediate shaft driven by the engine of the vehicle, two sliding clutch devices keyed on said intermediate shaft, two forks secured to said bent rod and controlling the sliding of the clutch devices, two bevel-pinions mounted loose on said intermediate shaft and adjacent the clutch devices, a third bevel pinion meshing with said two first pinions, a spindle supporting said third pinion, a worm on said spindle, a worm wheel meshing with said worm and keyed on the shaft which carries the curved lever, a rod pivoted on said intermediate lever and carrying a pinion meshing with a corresponding pinion formed on the steering column of the vehicle.

4. In an automobile vehicle having four wheels and a steering control member, four hinged parallelogram systems connecting the chassis of the vehicle to said wheels, said parallelogram systems being arranged in pairs on each side of said chassis, means interconnecting each pair of said parallelogram systems whereby each pair operates in unison, means for actuating said parallelogram systems for raising one side of the chassis and simultaneously and correspondingly lowering the other side of the latter, means operatively connecting said actuating means with said steering control member for controlling the operation of said actuating means, and speed responsive means operatively connected with said actuating means for modifying the action of the latter.

PAUL LÉON FRÉRET.